UNITED STATES PATENT OFFICE.

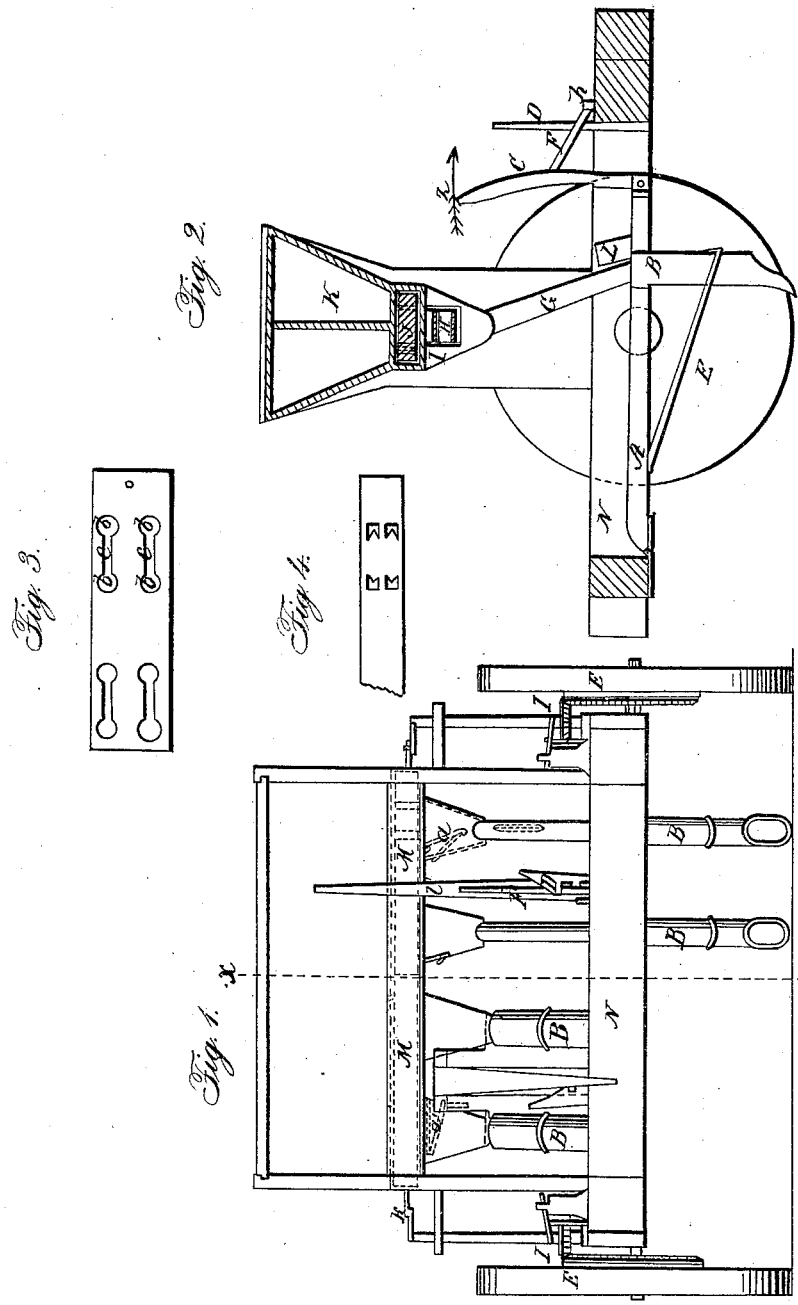

PETER HORN, OF HAGERSTOWN, MARYLAND.

IMPROVEMENT IN SEED-PLANTERS.

Specification forming part of Letters Patent No. 9,955, dated August 23, 1853.

*To all whom it may concern:*

Be it known that I, PETER HORN, of Hagerstown, in the county of Washington and State of Maryland, have invented certain new and useful Improvements in Seeding-Machines; and I do hereby declare that the following is a full, clear, and exact description of the same, reference being had to the accompanying drawings and the letters of reference marked thereon.

In the drawings, Figure 1 is an end elevation. Fig. 2 is a longitudinal section taken in the line *x x*. Fig. 3 is a detached view, showing the openings in the seed-bar.

The nature of my invention consists in providing the boot with an arm, which is attached to the frame by a hinge and is operated by a lever whose fulcrum is also attached to the frame, and by which the boot may be lowered or elevated at pleasure; also, in having the feed-bar divided in the center and each operated by different powers.

To enable others skilled in the art to make and use my invention, I will proceed to describe its construction and operation.

I construct a suitable frame, N, of wood, and place it on wheels E E in the ordinary way. At the forward end of the frame I attach an arm, A, to which the boots B B B B are attached. At the other end I attach a lever, C, which raises or lowers the arm at pleasure. The fulcrum of the lever C is composed of a rod or bar, F, one end of which is fastened or secured to the stationary frame by means of a joint, *n*, which allows it to work freely, while the other end is secured in a similar manner to the lever C, and forms an adjustable fulcrum for said lever. Thus it will be seen that when the lever C is forced in the direction of the arrow Z the lever A will be raised to any required elevation, together with its appendages. On the arm A is attached a projection, L, which (when the arm is elevated in passing over uneven surfaces) strikes the spring *a* (shown in dotted lines) and raises it to the position seen at *a'*, (shown in dotted lines,) and thereby closes the aperture through which the seed passes into the boot and thence into the ground, and thereby saving the grain which would otherwise be lost.

I have suitable gear, 1, attached to the driving-wheel E, for the purpose of operating the feed-bar M, which is divided in the center and receives a reciprocating motion from the crank K, which is driven by the gear 1, as above described, while the other section of the bar receives a similar motion from a similar crank, which is driven by the opposite wheel.

The sliding seed-bar is perforated with four holes, *b b b b*, Fig. 3, over each boot. These perforations are connected by a slot, *c*, which allows the grain to pass through, and thereby prevent its wasting or breaking while in operation. The spring *a*, which is designed for the purpose of closing the apertures where the grain passes out into the tube, are made of metal in the form seen in the drawings, and are secured to the bottom or under surface of the hopper by means of a hinge, which allows them to move freely on the inside of the tube. One end of the spring passes through the tube and is acted upon by the projection L on the arm A. When the arm A is required to be kept in the position seen in Fig. 2, the clamp D is hooked onto the bar F, which holds it in its place in the most effectual manner.

What I claim as my invention, and desire to secure by Letters Patent, is—

1. The spring *a*, in combination with the projection L and arm or lever A, for the purpose of opening and closing the recess through which the seed passes, substantially as set forth.

2. The arm or lever A, in combination with the lever C and fulcrum F, for the purpose of raising or lowering the drill-tubes and operating the springs *a*, substantially as herein set forth and described.

PETER HORN. [L. S.]

Witnesses:
H. SCHLEIGH,
W. T. HAMILTON.